United States Patent
Jackson

[15] 3,647,513
[45] Mar. 7, 1972

[54] METHOD FOR IMPROVING THE ADHESION OF POLYESTER COMPOSITIONS

[72] Inventor: William E. Jackson, Akron, Ohio
[73] Assignee: The Goodyear Tire & Rubber Company, Akron, Ohio
[22] Filed: Oct. 26, 1970
[21] Appl. No.: 84,219

Related U.S. Application Data

[63] Continuation of Ser. No. 689,759, Dec. 12, 1967, abandoned.

[52] U.S. Cl. ............117/47 A, 117/138.8 F, 161/190, 161/231, 156/3
[51] Int. Cl. ............................................B44d 1/092
[58] Field of Search............117/47 R, 138.8 F; 156/3, 4; 161/231, 190

[56] References Cited

UNITED STATES PATENTS

| | | | |
|---|---|---|---|
| 3,314,743 | 4/1967 | Gagliardi | 117/47 R |
| 3,317,339 | 5/1967 | Fortner et al. | 117/47 R |
| 3,326,742 | 6/1967 | Shepherd | 117/47 R |
| 3,419,463 | 12/1968 | Timmons | 161/231 |

*Primary Examiner*—Murray Katz
*Attorney*—F. W. Brunner and J. D. Wolfe

[57] ABSTRACT

This invention relates to a method of improving the adhesion of a polyester composition to itself or to metals. This is achieved by treating the surface of the polyester composition with a treating agent preferably in a solvent to enhance the bond strength between isocyanate-type adhesives and the surface of the polyester composition. The treating agent is a tertiary amine of the aliphatic, cycloaliphatic and aromatic-type.

8 Claims, No Drawings

3,647,513

METHOD FOR IMPROVING THE ADHESION OF POLYESTER COMPOSITIONS

This application is a continuation of application Ser. No. 689,759, filed Dec. 12, 1967, now abandoned.

This invention relates to a method of obtaining improved adhesion between polyester compositions per se. More specifically, this invention relates fail- a method of treating the surface of a polyester composition which may contain glass fiber reinforcement to enhance the effectiveness of an isocyanate adhesive.

Heretofore in making laminates between polyester compositions per se it has been customary to clean the surface to be bonded with a suitable solvent to remove greases and other contaminants. This treatment has frequently resulted in a surface that would not give satisfactory bonds for some unknown reason. Therefore to insure that a satisfactory bond is obtained under all conditions the better practice has been to sandblast the surface of the polyester composition or otherwise abrade it away and then give the surface a solvent wash. It should be readily evident that the use of a sandblasting treatment increases the cost and also presents problems due to the contamination of the surrounding area with the fines from the sandblasting treatment.

Therefore it is an object of this invention to provide a method for obtaining improved adhesion between polyester compositions per se and a polyester composition having a treated surface. This object and other advantages may be obtained by the practice of this invention as will be evident from the ensuing discussion.

The surface of the polyester composition is subjected to a treatment with a suitable treating agent preferably dissolved in a solvent, a suitable adhesive of the isocyanate type is applied to the surface of the polyester composition to be bonded or laminated and the adhesive is allowed to set or cure.

More specifically, the polyester compositions are those utilized for constructing panels or built-up objects of substantial rigidity, for instance, the use of polyester compositions containing glass fiber reinforcements such as those used in making automobile bodies or parts, boats, and related objects are the ones to which this invention has its primary benefit. These polyester compositions may be made by reacting suitable polycarboxylic acids or their anhydrides with suitable glycols such as ethylene, propylene, butylene and higher. For these purposes the polycarboxylic acids of the aromatic type are particularly suitable as they tend to give a more rigid composition. Specific examples of these aromatic polycarboxylic acids are phthalic, isophthalic and terephthalic. Also unsaturated polycarboxylic acids such as maleic and fumeric are utilized where it is desired to introduce a small to a relatively large amount of unsaturation in the polyester composition, especially where the composition is to be cured or set by peroxide curing, either alone or in conjunction with an unsaturated monomer or alpha olefin such as styrene or acrylonitrile, etc.

The glass fiber reinforced polyester compositions are well known and are in wide commercial use, but in general these compositions are prepared by forming a copolymer containing maleic anhydride or related unsaturated polycarboxylic acids and one of the phthalic acids or lower aliphatic dicarboxylic acids with ethylene glycol or the ether glycols such as di- or tri-ethylene glycol.

The agent for treating the surface of the polyester composition is a tertiary amine of the aliphatic, cycloaliphatic, or heteroaromatic hydrocarbon class. Representative tertiary amines are triethylene diamine, alkyl piperazines, alkyl morpholines, and dialkylated lower amines such as triethylamine. The agent or treating agent is preferably dissolved in a suitable solvent such as the ketones or halogenated hydrocarbon solvents, although any of the low-boiling inert organic liquids in which the amine is soluble may be used. Usually about 0.5 to 5 or more parts of the agent is dissolved in 100 parts of solvent, and depending on the specific activity of the tertiaryamine about 1 to 3 parts is preferred. This concentration of the treating agent in the solvent allows adhesion to be obtained with the usual application methods.

The polyester composition preferably in the form of a sheet or a thin film is treated with the treating agent by applying the treating agent preferably dispersed or dissolved in a solvent to the surface by brushing, spraying, rolling or other suitable techniques, then allowing the solvent to evaporate to leave the treating agent deposited on the surface of the polyester composition. Then the polyester whose surface has been so prepared is treated with a polyurethane adhesive and the two surfaces to be joined are placed in contact and maintained in contact until the adhesive has had time to laminate or bond the two compositions together.

Suitable solvents for washing the surface of the polyester composition and the metals are those such as methyl ethyl ketones, acetone, ethylene dichloride, methylene chloride, chloroform, toluene, benzene, xylene, the aliphatic hydrocarbons, coal tar and petroleum naphthas, and chlorinated solvents and naphthas. It should be noted that some of the chlorinated solvents tend to react with some tertiary amines to form a precipitate. Consequently, the solvent solution sometimes has limited pot life and is made immediately before its use.

An adhesive of the isocyanate class can be prepared by reacting the reactive hydrogen containing materials of about 500 to 4,000 with an organic polyisocyanate, a low molecular weight polyamine containing material and preferably an inert filler. The adhesive of the isocyanate class is prepared by forming a prepolymer and then mixing the prepolymer with a curative, the prepolymer being formed by the reaction of the reactive hydrogen containing material. Preferably a polypropylene ether polyol of about 1,000 to 3,000 molecular weight and an organic polyisocyanate containing at least two and preferably more than an average of two isocyanates per molecule. This prepolymer can contain about five to as much as 70 percent by weight of a filler based on the reactive hydrogen containing material. One of the prime functions of the inert filler such as clays, silica, etc., is to act as a viscosity increaser and also to hasten the building of green strength or tack in the adhesive. The curative may contain polyhydroxyl terminated materials of relatively low molecular weight, usually less than about 600. Representative of these materials are N,N,N',N'-(2-hydroxylpropyl) ethylene diamine or the adduct formed by reacting a material such as pentaerythritol, trimethylol, propane, trimethylol ethane and the hydroxylated sugars with alkylene oxides such as propylene oxide. These curatives may also contain in addition to the low molecular weight hydroxyl terminated or amine terminated materials, a small amount of catalysts such as the tertiary amines or the organic tin compounds. Usually the adhesives of the isocyanate class of a relatively high isocyanate to reactive hydrogen material ratio is usually in excess of 2.5 and preferably about 5 to 7 mols per mol.

The nature of this invention may be more specifically exemplified by the following examples wherein all parts are by weight unless otherwise indicated:

EXAMPLE A

A suitable adhesive of the isocyanate class was prepared by reacting the following ingredients:

100 parts of a polypropylene ether glycol of about 2,000 molecular weight having dispersed therein 60 parts of talc coated with zinc stearate and an organic polyisocyanate mixture comprising 28 parts of a polyisocyanate A and 32 parts of toluene diisocyanate where polyisocyanate A is the phosgenated mixture obtained by phosgenation of the rearrangement product of the reaction of aniline and formaldehyde as taught in U.S. Pat. No. 2,683,730.

This prepolymer was then mixed in a two-component pressure adhesive gun with a curative comprising 30.8 parts N,N,N',N'-(2-hydroxylpropyl) ethylene diamine and 13.2 parts of a propylene oxide adduct of pentaerythritol of about 400 molecular weight to form the adhesive.

EXAMPLE B

Another adhesive of the isocyanate class was prepared by reacting 100 parts polypropylene ether glycol of 2,000 molecular weight having dispersed therein 63 parts of zinc stearate coated talc with an isocyanate mixture comprising 29.8 parts of a polyisocyanate A and 33.7 parts of toluene diisocyanate. This prepolymer was mixed with a curative to form an adhesive. The curative was formed by mixing 49.6 parts of a propylene oxide adduct of ethylene diamine of about 500 molecular weight with 12.4 parts of a propylene oxide adduct of pentaerythritol of about 500 molecular weight.

EXAMPLE I

A tenth of an inch thick polyester sheet reinforced with fiber glass was cut into panels 1×3 inches. These panels were cleaned or treated in the manner shown in Table 1. Then each set of panels after washing with the indicated solvent was allowed to dry.

One piece from each set of the treated panels had an adhesive applied thereto. The adhesive from Example A was applied from a two-component pressure adhesive gun. The piece containing the adhesive was placed in contact with the other piece of the set to form a cross and they were maintained in this position until the adhesive had cured. The conditions of cure are those set forth in Table 1. The cured samples then were subjected to a pull test and the bond strength developed between the FRP panels or pieces are indicated in pounds per square inch with the nature of the failure of the bond between the adhesive and the FRP panel being indicated. The samples were all cured for 16 hours at 75° F. (designated as cure condition A) and then half of the samples were given an additional cure of one hour at 250° F. (designated as cure condition B).

TABLE 1

| FRP Surface Treatment | Cure Conditions A | | Cure Conditions B | |
|---|---|---|---|---|
| Solvent Wash | Bond Strength p.s.i. | Type Failure*** | Bond Strength p.s.i. | Type failure*** |
| Methylene chloride | 232 | mostly SR | 340 | SR |
| 1,3,4 trimethyl piperazine * ethylene dichloride | 360 | 50/50 FT/SR | 336 | 75/25 FT/SR |
| N-ethyl morpholine* in ethylene dichloride | 418 | slight SR | 337 | no SR |
| Triethylene diamine* in ethylene dichloride | 432 | 50/50 FT/SR | 442 | no SR |
| Triethylene diamine* in methyl ethyl ketone | 359 | 50/50 FT/SR | 377 | slight SR |

*- 2 percent by weight solution.

*** - SR indicates surface release and FT indicates fiber tear.

From the results on the bond strength shown in Table 1 it should be evident that the use of a cleaning solution containing a tertiary amine results in an appreciable improvement in the effectiveness of the adhesive.

EXAMPLE II

To illustrate the effect of open time, i.e., the time from formation of the adhesive to the assembly of a panel, additional FRP panels were washed using the surface treatment shown in Table 2 with the adhesive prepared according to teachings of Example B. This adhesive was applied to the surface of a prepared panel. Each set of panels were placed in position to form a cross, then they were clamped together under 15 pounds per square inch pressure and held at 130° F. for 10 minutes. Then the samples were unclamped and pulled apart 2 minutes later after being unclamped. The results of the pull tests are recorded in Table 2 along with the type of adhesive failure.

Half of the samples were allowed to stand 4 minutes before lamination of the cross so the adhesive of these samples had been made 16 minutes when the samples were pulled. On the other hand, the remaining samples were cemented with an adhesive that had been made 12 minutes, thus the adhesive of the cross specimen had been made 24 minutes when the specimen were pulled. These samples are indicated in Table 2 as ones having 4 and 12 open time, respectively.

TABLE 2

| FRP Surface Preparation | Bond Strength, p.s.i. | |
|---|---|---|
| | Open Time | |
| | 4 minutes | 12 minutes |
| Methyl ethyl ketone | 184 | 297 |
| Methyl ethyl ketone containing 2% triethylene diamine | 267 | 317 |

EXAMPLE III

Tensile cross sepcimens were prepared with FRP panels (1 inch × 3 inch × 100 mils) were treated as indicated in Table 3. the adhesives were hand-mixed batches of adhesive similar to those of Example A. No open time was allowed and the specimens were cured at room temperature for 40 hours (indicated as 75° F. cure) and half of the cross specimens were baked one hour at 250° F. (indicated as 250° F. cure). The cured samples were then subjected to the pull test and the nature of the adhesive strength and the type failure is recorded in Table 3.

TABLE 3

| FRP surface preparation (wash) | Tensile bond strength, p.s.i. | | Type of Failure |
|---|---|---|---|
| | 75° F. cure | 250° F. cure | |
| Methyl ethyl ketone | 322 | | Heavy FT, center-60% SR |
| | 350 | | Heavy FT, 30% SR |
| | | 368 | 15% light FT, 85% SR |
| | | 423 | 75% deep FT, 25% SR |
| Methyl ethyl ketone containing 2% triethylene diamine | 419 | | Heavy FT both panels. Traces of SR at edges. |
| | 400 | | Heavy FT both panels. 10-15% SR at edges. |
| | | 419 | Heavy FT-slight SR at edges |
| | | 451 | 100% FT |

From the foregoing examples it is indicated that the use of tertiary amines in the amount of about a half to two or three percent by weight in a suitable solvent to clean the grease off the surface of the polyester composition results in an appreciable improvement in the adhesion between the adhesive and the polyester composition. The nature of these adhesives is further illustrated by copending application Ser. No. 360,753, filed Apr. 17, 1964, now abandoned. Other tertiary amines that belong to the polyurethane catalyst class may be utilized in the above working examples to clean the polyester composition and thus achieve an improvement in the adhesive bond. Thus the typical N-alkyl-morpholine of one to 20 carbon atoms and preferably one to 10 and the alkyl piperazines where the alkyl is of one to 10 to 20 carbon atoms may be utilized along with the alkylated tertiary amines where the alkyl radical is from one to 20 carbon atoms and preferably one to 10. Normally, after the surfaces of the polyester composition have been treated with a solvent solution or dispersion in a solvent for the grease but a nonsolvent for the polyester composition, the adhesive is applied to the surface and the polyester composition is brought into laminating relationship with another polyester composition or with a suitable metal such as steel or aluminum and maintained in this laminative relationship until the adhesive has cured. This cure may be effected at room temperature or it may be effected at elevated temperatures. Usually about one hour at 75° F. gives sufficient green strength to bond the materials even after they have been unclamped and the ultimate physicals are developed on aging. Of course, this may be hastened by maintaining the sample at an elevated temperature of about 100° to 350° F. for 15 minutes to 1 or more hours depending on the temperature.

While certain representative embodiments and details have been shown for the purpose of illustrating the invention, it will be apparent to those skilled in this art that various changes and modifications may be made therein without departing from the spirit and scope of the invention.

What is claimed is:

1. A method for improving the adhesion between an adhesive of the isocyanate class and a solid polyester composition comprising treating the surface of a solid polyester composition with a solution of 0.5 to about five parts by weight of a tertiary amine of the polyurethane catalyst class in 100 parts by weight of low boiling inert organic solvent and then applying an adhesive of the isocyanate class and curing said adhesive.

2. The method of claim 1 wherein the polyester composition contains glass fiber.

3. The method of claim 1 wherein the tertiary amine is selected from the class of N-alkyl-morpholine, alkyl piperazine, tertiary alkyl amine.

4. The method of claim 1 wherein the tertiary amine is triethylene diamine.

5. The method of claim 1 wherein the tertiary amine is dispersed or dissolved in a solvent for greases but a nonsolvent for the polyester compositions on short exposure.

6. The method of claim 1 wherein the adhesive of the isocyanate class is a reaction mixture of a polypropylene ether polyol, of about 1,000 to 3,000 molecular weight, an organic polyisocyanate and hydroxyl terminated material of less than 600 molecular weight.

7. The method of claim 6 wherein each mol of polypropylene ether polyol is reacted with 5 to 7 mols of organic polyisocyanate to form a prepolymer prior to addition of the hydroxyl terminated material of less than 600 molecular weight.

8. The method of claim 7 wherein the hydroxyl terminated material is selected from the class consisting of N,N,N',N'-(2-hydroxylpropyl) ethylene diamine and a propylene oxide adduct of pentaerythritol.

* * * * *